July 30, 1946.    W. J. O'BRIEN    2,404,810
RECEIVING APPARATUS FOR RADIO BEACON SYSTEMS
Filed Dec. 23, 1941    2 Sheets-Sheet 1
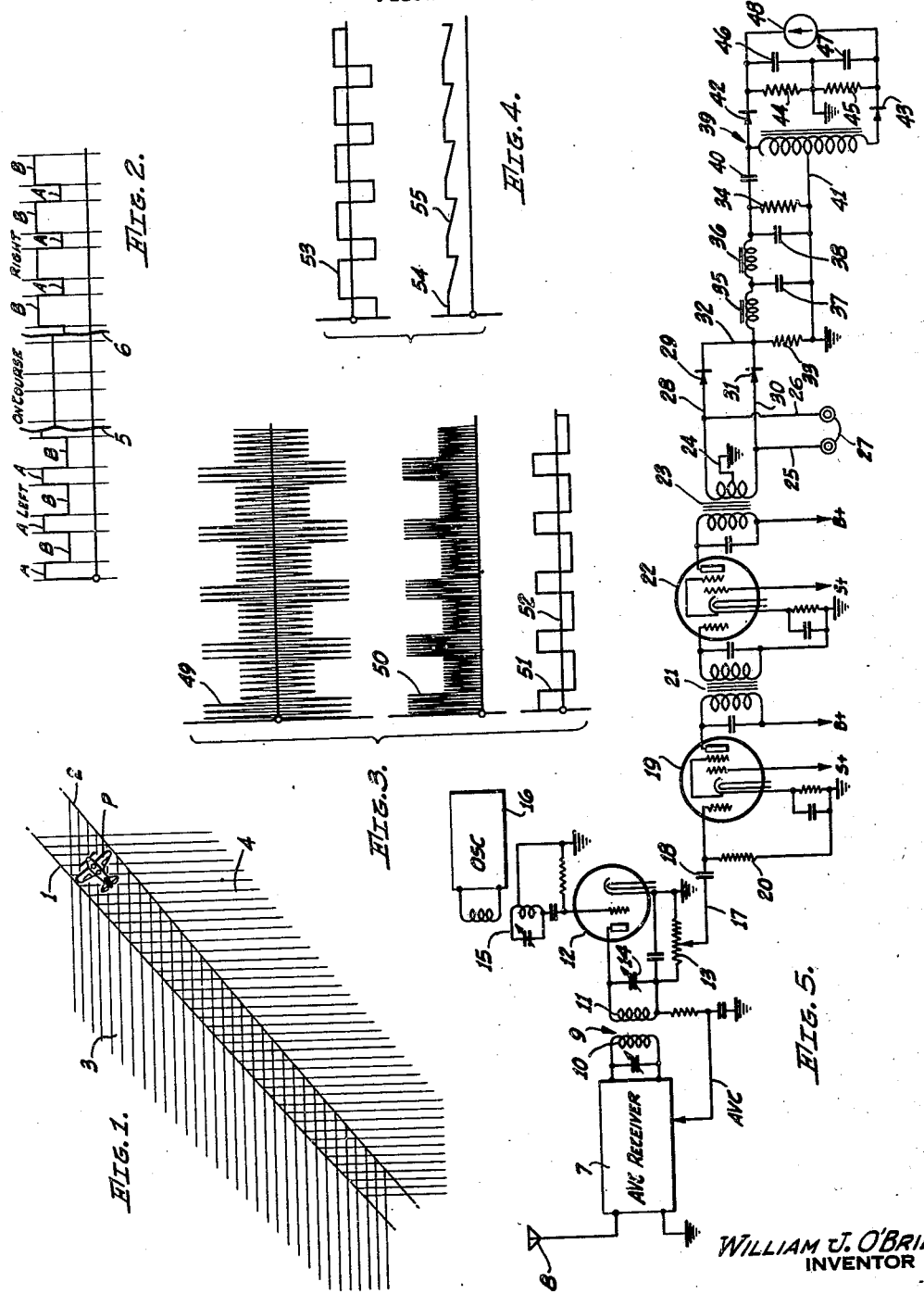
WILLIAM J. O'BRIEN,
INVENTOR
BY
*Harold W. Mattingly*
ATTORNEY.

July 30, 1946. W. J. O'BRIEN 2,404,810
RECEIVING APPARATUS FOR RADIO BEACON SYSTEMS
Filed Dec. 23, 1941 2 Sheets-Sheet 2
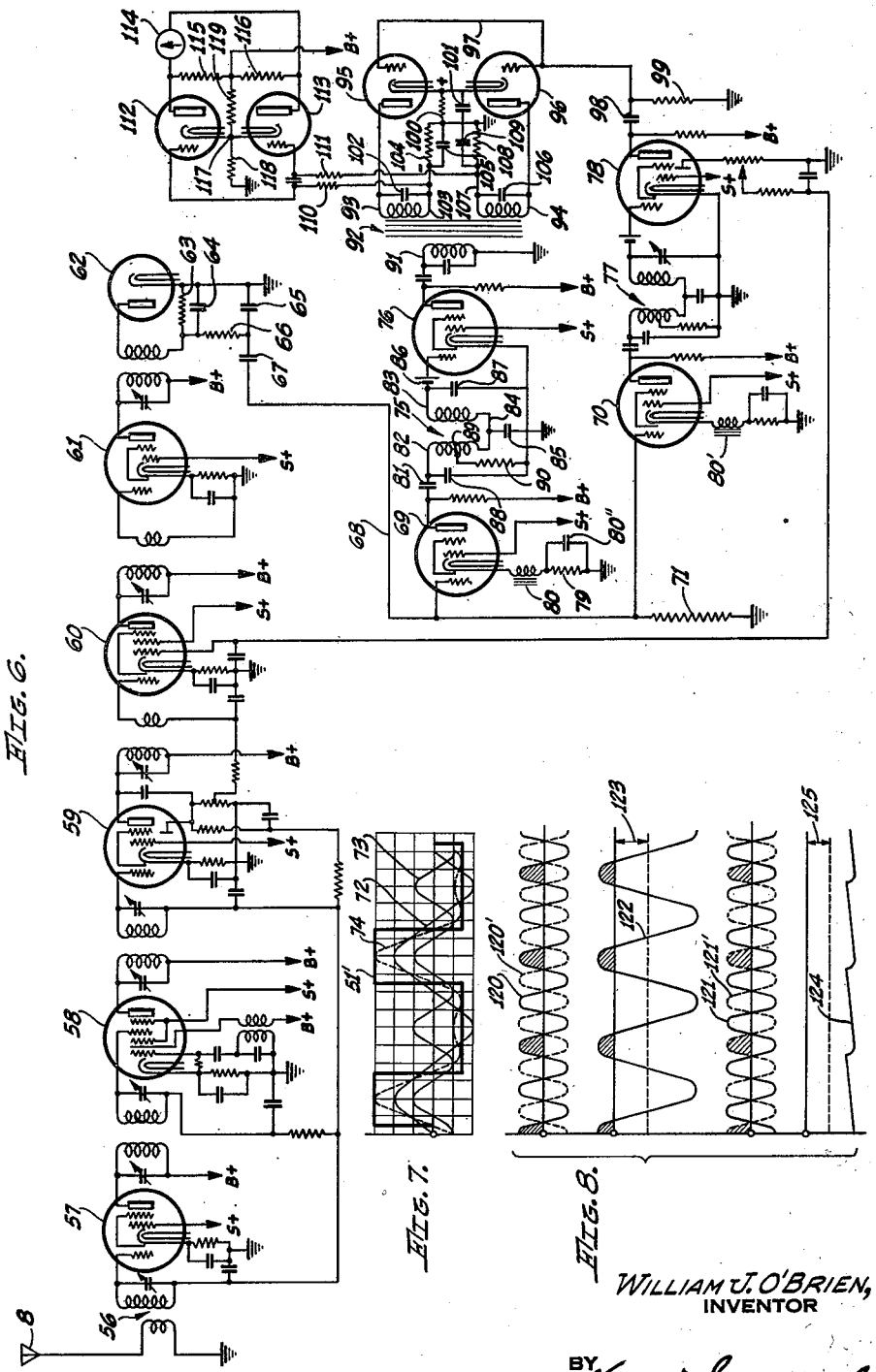
WILLIAM J. O'BRIEN, INVENTOR
BY Harold W. Mattingly
ATTORNEY.

Patented July 30, 1946

2,404,810

UNITED STATES PATENT OFFICE 2,404,810

RECEIVING APPARATUS FOR RADIO BEACON SYSTEMS

William J. O'Brien, Los Angeles, Calif., assignor to The Decca Record Company, Limited, London, England, a corporation of Great Britain Application December 23, 1941, Serial No. 424,159

4 Claims. (Cl. 172—245)

My invention relates to radio beacon systems and has particular reference to a radio receiving and indicating apparatus which finds particular utility when employed with an equisignal type of beacon system.

Equi-signal beacon systems operate to generate a field strength pattern which includes a line along which the signal intensity of two groups of radio transmitters are equal, which line is the "course" defined by the beacon and along which it is intended that the aircraft or other vehicle be maneuvered.

The signals from the two groups of transmitters are rendered distinguishable either by modulating the signals at different audible frequencies or by keying the two groups of transmitters off and on alternately and in a distinguishable time sequence, the presently employed arrangement being that in which one group of transmitters is keyed with the International Morse code signal for A while the other is alternately keyed N. In either event the "on course" position of the vehicle is indicated by the reception at the vehicle of signals of equal intensity from the two groups of transmitters and an "off course" location is indicated by the predominance of one signal over the other.

In both of these types of equi-signal beacon systems the signals are perceived audibly with the result that extraneous noises such as static and other radio interference tends to make it more difficult to distinguish between the signals. Audible perception of the signals requires that the pilot of the aircraft or other vehicle wear headphones or similar devices and also requires the pilot to consciously direct his attention to distinguishing the signals with the result that the pilot's freedom of movement is impaired and his attention is diverted from the control and from the navigation instruments.

The desirability of providing for a visual perception of the beacon signals has long been recognized and while attempts have in the past been made to realize this desiratum, no one prior to my invention has provided a satisfactorily operating device. The modulating of the signals at different audible frequencies represents one such attempt, these different frequencies being applied to vibrating reeds in the belief that a comparison of the amplitudes of the vibration of the reeds would provide an indication of the relative strengths of the signals. This expedient was not satisfactory because of the necessity of providing suitable audio frequency generating and modulating mechanism for the beacon transmitters and because of the liability of the reeds getting out of order through mal-adjustment or injury, the reeds of necessity being very delicate and lacking in mechanical strength. Furthermore, it was found that the indication given was so coarse as to make it extremely difficult for a pilot to keep his craft "on course" without having recourse to earphones, whereupon all of the hoped for advantages were lost.

It is, therefore, an object of my invention to provide a receiving apparatus for use with radio beacon systems of the equi-signal type which overcomes the above noted disadvantages by providing a visual indication of the location of a vehicle equipped with the apparatus relative to a course defined by the beacon system.

It is also an object of my invention to provide a receiving apparatus of the character set forth in the preceding paragraph in which the indicating portion of the apparatus is highly sensitive and operates to positively indicate visually small departures of the vehicle from the defined course.

It is an additional object of my invention to provide an apparatus of the character set forth hereinbefore in which the received signal is rectified and the polarity of the peak of the resulting signal is employed to indicate the position of the vehicle relative to the course.

It is a still further object of my invention to provide an apparatus of the character hereinbefore referred to in which the received signal is rectified to provide an alternating current of complex wave form and which also includes means for comparing the phase relation between the fundamental and the second harmonic included in such complex wave to thereby indicate the location of the vehicle with respect to the defined course.

It is also an object of my invention to provide a method of visually indicating the position of a vehicle with respect to a course defined by a radio beacon of the equi-signal type which consists in rectifying the beacon signals to produce a current of complex wave form alternating in accordance with the keying of the beacon transmitters and ascertaining the polarity of the maximum peak current.

It is additionally an object of my invention to provide a method of visually indicating the position of a vehicle with respect to a course defined by a radio beacon of the equi-signal type which consists in rectifying the beacon signals to produce a current of complex wave form alternating in accordance with the keying of the beacon transmitters and determining the phase relation between the fundamental and the second harmonic included in such complex wave.

Other objects and advantages of my invention will be apparent from a study of the following specifications, read in connection with the accompanying drawings, wherein:

Fig. 1 is a diagrammatic view illustrating an aeroplane as proceeding outwardly along an "on course" zone of equal signal intensities such as is produced by a radio beacon system of the equi-signal type, the shaded areas on either side of the "on course" zone representing the areas in which one of the beacon signals predominates in intensity over the other beacon signal;

Fig. 2 is a graph illustrating the way in which the relation between the intensities of the two groups of beacon signals varies with changes of the position of the vehicle with respect to the "on course" line defined by the beacon;

Fig. 3 comprises a group of charts or graphs indicating the character of the received beacon signals at various stages in the progress of the signals through the receiving apparatus of my invention;

Fig. 4 comprises a series of graphs or charts indicating the character of the signals at points in the receiving apparatus subsequent to those represented in Fig. 3;

Fig. 5 is a wiring diagram schematically illustrating one form of receiving apparatus constructed in accordance with my invention;

Fig. 6 is a schematic wiring diagram illustrating a modified form of receiving apparatus;

Fig. 7 is a graph illustrating the manner in which the rectified beacon signals can be approximately resolved into a fundamental sine wave and a sine wave of double frequency; and Fig. 8 comprises a series of charts or graphs portraying the action of the indicating portion of the apparatus embodied in the modification of my invention which is illustrated in Fig. 6.

Referring to the drawings, I have illustrated in Fig. 1 an aeroplane P or other vehicle as being guided outwardly along an "on course" zone which is bounded in Fig. 1 by the lines 1 and 2. This zone comprises that area immediately adjacent a line of equal signal intensity with respect to independent radio frequency signals emanated from two groups of radio transmitters.

The type of radio beacon transmitting equipment employed for producing an equi-signal "on course" zone is well known and forms no part of the present invention. For a detailed explanation of such a radio beacon system reference may be had to the Bureau of Standards Journal of Research for January, 1933, vol. 10, page 7. Such a system operates to produce within the zone bounded by the lines 1 and 2 separate radio frequency signals of equal intensity, whereas, in the zone indicated generally by the reference character 3 and lying to the left of the line 1, one of the beacon signals will predominate in intensity over the other, whereas, in the zone indicated generally by the reference character 4 and lying to the right of the line 2, the other radio beacon signal will predominate over the first-mentioned signal.

In accordance with my invention the radio beacon transmitters are preferably keyed "off" and "on" to provide for the distinguishing of one set of radio frequency signals from the other set. This keying is so arranged that one of the radio frequency signals is present during the time the other is absent and vice versa. Furthermore, one of the signals is caused to be radiated for a relatively short time, whereas, the other is caused to be radiated for a relatively long time in each cycle.

This condition is graphically illustrated in Fig. 2 wherein the relative signal intensities are plotted as ordinates and time is plotted as abscissa. That portion of the chart lying between the origin and the wavy line 5 represents the signals which are received at the plane P when that plane is in the "off course" zone 3.

It will be noted that the signals received at the plane P comprise high intensity peaks A of relatively short duration and low intensity signals B of relatively long duration. The peak signals A will hereinafter be referred to as being the A signals, whereas, the signals of longer duration will be hereinafter referred to as the B signals.

As the plane P moves nearer and nearer to the "on course" zone, the intensity of the A signals will decrease while the intensity of the B signals will increase until these A and B signals are of equal intensity when the plane is in the position illustrated in Fig. 1. When this condition obtains, the signals received at the plane are equal and indistinguishable as is indicated in Fig. 2 in that portion lying between the wavy lines 5 and 6. If, on the other hand, the plane P is positioned to the right of the "on course" zone and in the zone 4, the relative intensities of the signals will be reversed from that previously described with the result that the B signals will predominate in intensity over the A signals as is illustrated in Fig. 2 by that portion of the figure disposed to the right of the wavy line 6.

The receiving apparatus comprising the preferred form of my invention is illustrated diagrammatically in Fig. 5 as comprising an ordinary radio frequency receiver and amplifier indicated generally by the rectangle bearing the reference character 7, this receiver being adapted to pick up the A and B signals as by means of a suitable antenna 8.

The amplified output of the receiver 7 is coupled by means of a coupling transformer 9 including a tuned primary winding 10 and a tuned secondary 11 to a grid controlled rectifier tube 12. The signal voltage developed across the winding 11 is applied between the plate and cathode of the tube 12, the cathode return circuit including a resistance 13 shunted by a condenser 14.

The grid to cathode circuit of the tube 12 is preferably coupled as by means of a suitable coupling transformer 15 to a radio frequency oscillator of any suitable type represented diagrammatically by the rectangle 16. The oscillator is adjusted to produce a radio frequency current which differs from the frequency of the signals A and B by an amount adapted to produce a beat frequency signal which is preferably, although not necessarily, within the audible range.

Since the high frequency produced by the oscillator 16 is applied between the grid and the cathode of the tube 12 and since the received A and B signals are applied between the plate and cathode of the tube 12, the tube 12 will operate to rectify the voltage appearing across the winding 11 only at such time as the grid and plate are both positive with respect to the cathode. The tube 12 will accordingly produce in the resistance 13 a pulsating direct current, which pulsations have a frequency equal to the difference in frequency between the signal produced by the oscillator 16 and the frequency of the A and B signals. If desired, the negative potential produced on the plate of the tube 12 may be used for the purpose of the automatic volume control in the receiver 7 as by connecting the plate circuit for the tube 12 to the grid circuits of the various tubes employed in the amplifier 7 through an automatic volume control bus AVC.

The resistance 13 preferably comprises a potentiometer, the arm portion of which is connected as by means of a conductor 17 through a blocking condenser 18 to the grid of an amplifier tube 19. The grid of the tube 19 is maintained at a direct current ground potential as by connecting the grid to ground through a grid resistance 20. The tube 19 is employed as a voltage amplifier and is coupled through a suitable coupling transformer 21 to the input circuit of a power amplifier tube 22 whose output appears across the secondary of an output transformer 23.

In Fig. 5 the heater circuits have been omitted as have the plate supply and screen supply circuits for the tubes 19 and 22 since these circuits are well known in the art and form no part of the present invention.

The secondary of the transformer 23 is preferably grounded at a mid tap as by a conductor 24, whereas, the ends of the windings may be connected as by means of conductors 25 and 26 to headphones or other suitable audio frequency responsive means 27 if it is desired to permit the pilot of the plane P or other vehicle to perceive the signals A and B audibly.

One end terminal of the secondary of the transformer 23 is preferably connected as by means of a conductor 28 to a half wave rectifier 29, whereas, the other end terminal is connected as by means of a conductor 30 to a half wave rectifier 31, the cathodes of the rectifiers 29 and 31 being interconnected as by means of a conductor 32 which is in turn connected to ground through a resistance 33.

The voltage which may be produced across the resistance 33 may also be transmitted to a resistance 34 through a low pass filter including series connected inductances 35 and 36 and shunt connected condensers 37 and 38. Such voltage as may appear across the resistance 34 is applied to the primary portion of the winding of an auto-transformer 39 through a condenser 40, the mid tap of the auto-transformer winding being grounded as by means of a conductor 41.

The end terminals of the auto-transformer winding are connected, respectively, to the anodes of half wave rectifiers 42 and 43, the cathodes of these rectifiers being connected to ground, respectively, through resistances 44 and 45. The resistances 44 and 45 are preferably shunted by condensers 46 and 47, respectively. The cathodes of the rectifiers 42 and 43 are furthermore interconnected by a galvanometer 48 which is preferably of the zero center type and of the current responsive type having a very low internal resistance.

The manner in which the above described apparatus operates to provide a visual indication of the location of the plane P with respect to the "on course" zone may best be had by assuming certain operating conditions and describing the operation of the apparatus in connection with the explanatory drawings, Figs. 3 and 4.

If it be assumed that the plane P is to the left of the "on course" zone and in the area indicated generally by the reference character 3, the signals received at the plane P by the antenna 8 will be such as are represented by that portion of Fig. 2 lying between the origin and the wavy line 5; that is, the A signals will predominate in intensity over the B signals. The output of the receiver 7 will, therefore, correspondingly fluctuate and these fluctuations will likewise appear in the intermediate or audible beat frequency which is amplified by the amplifier tubes 19 and 22. The voltage appearing across the secondary of the output transformer 23 will, therefore, be such as that represented by the sine curve 49 in Fig. 3.

It will be noted that this curve varies in amplitude in accordance with the relative amplitudes of the A and B signals. The curve 49, therefore, represents the voltage which is applied to the rectifiers 29 and 31 which operate as full wave rectifiers to cause a direct current to flow through the resistance 33. The curve 50 shown in Fig. 3 represents the voltage which appears across the resistance 33.

The filter comprising the inductances 35—36, the condensers 37—38 and the resistance 34 operates to exclude the high frequency component of the pulsating voltage represented by the curve 50. The condenser 40 serves to isolate the winding of the auto-transformer 39 with respect to direct current with the result that there is applied to the primary portion of this winding an alternating voltage such as that illustrated by the curve 51 in Fig. 3.

Attention is directed to the fact that by eliminating the high frequency component and the direct current component from the voltage which is applied to the primary portion of the winding of the auto-transformer 39, the axis 52 of zero voltage is automatically caused to assume a position in which the area embraced between the positive portions of the alternating current wave and the axis is equal to that embraced between the negative portions of the alternating current and such axis. Thus, the peak value of the positive half cycle will bear the same ratio to the peak value of the negative half cycle as does the duration of the B signal to the duration of the A signal.

As previously noted, the B signal is of relatively long duration while the A signal is of relatively short duration so that the positive half cycle of the voltage represented by the curve 51 will have a peak value considerably exceeding the peak value of the negative half cycle. This voltage is accordingly applied to the rectifier 42, being the voltage which is applied across the primary portion of the winding of the auto-transformer 39. The voltage which is developed by the other half of the winding of the auto-transformer 39 is, of course, 180° out of phase with respect to the voltage which is applied to the primary portion of this winding. This out of phase voltage may accordingly be represented by the curve 53 of Fig. 4. It will be noted that the voltage which is applied across the rectifier 42 and resistance 44 is the voltage represented by the curve 51, whereas, the voltage which is applied across the rectifier 43 and its resistance 45 is the voltage which is represented by the curve 53.

The rectifier 42 will pass current during the time the plate thereof is positive with respect to the cathode and this current will flow through the resistance 44 tending to make the cathode of the rectifier 42 negative with respect to ground.

The ohmic value of the resistance 44 and the capacity of the condenser 46 is so chosen as to maintain the voltage of the cathode of the rectifier 42 substantially constant with respect to ground. That is to say, during the relatively short intervals that the high positive peak voltage of the curve 51 is applied to the rectifier 42, the voltage which appears across the resistance 44 and condenser 46 is of a corresponding magnitude and may be represented by the short horizontal line portions 54 of the lower of the two curves illustrated in Fig. 4. During the following negative half cycle, the rectifier will, of course, pass no current with the result that the condenser 46 will discharge its stored energy through the resistance 44 and the voltage measured between the cathode of the rectifier 42 and ground will gradually diminish as is represented by the sloping line 55 in Fig. 4. As soon as the plate of the rectifier 42 again swings positive, the voltage across the resistance 44 will immediately rise to the straight line value 54.

It will be recalled that the cathode of the rectifier 42 is directly connected to the cathode of the rectifier 43 through the low resistance galvanometer 48 so that the cathodes of the two rectifiers are maintained at substantially the same potential with respect to ground. This negative potential will exceed the positive peak value of the voltage which is applied to the plate of the rectifier 43 as may be readily seen by comparing the amplitude of the curve 54—55 with the amplitude of the positive half cycle portions of the curve 53 in Fig. 4. Thus the rectifier 43 will be blocked and will pass no current.

Similarly, the galvanometer 48 serves to connect the resistance condenser combination 45—47 in parallel with the resistance condenser combination 44—46 so that the current which flows from the plate to the cathode of the rectifier 42 will divide, half flowing through the resistance 44 and half flowing through the galvanometer 48 and thence through the resistance 45. This current flowing through the galvanometer 48 will cause the needle thereof to deflect in one direction, to the right for example, from its zero center position and this deflection may be used as an indication of the fact that the signals as picked up by the antenna are in accordance with the assumptions upon which the preceding description has been based; namely, that the plane or vehicle P is to the left of the "on course" zone and in the area 3 so that the A signal predominates over the B signal.

Assuming now that the plane P crosses the "on course" zone and shifts to the right of the desired course so as to be positioned within the area 4. Reference to Fig. 2 will indicate that the B signals will predominate over the A signals with the result that the voltage which is applied to the primary portion of the winding of the auto-transformer 39 will be 180° out of phase with that represented by the curve 51 in Fig. 3 and will instead correspond to the curve 53 of Fig. 4.

Similarly, the voltages applied to the rectifiers 42 and 43 will be reversed from that described in the preceding paragraphs with the result that the rectifier 42 will be blocked, the rectifier 43 will pass current, and current will flow from the rectifier 43 and through the galvanometer 48 and thence through the resistance 44 to ground. The direction of current flow through the galvanometer is thus reversed and its deflection from zero center will likewise be to the left or opposite to that resulting from the conditions assumed in the preceding description. It will thus be seen that the position of the galvanometer needle to the right or to the left of its zero center will correspondingly indicate the direction in which the vehicle must be moved to bring it back to the desired course.

Similarly, if the vehicle is "on course," the galvanometer will read zero. This is for the reason that the rectification of the A and B signals effected by the rectifiers 29 and 31 will provide across the resistance 34 a pure direct current so that no alternating voltage will be applied to the auto-transformer 39. Consequently no current can flow in the circuits associated with the galvanometer 48 and the galvanometer will, of course, indicate zero or its center position.

I have illustrated in Fig. 6 a modified form of apparatus which may be employed to provide a visual indication of whether the A signal or the B signal predominates in intensity. In Fig. 6 the antenna 8 is illustrated as being connected to the primary of an input transformer 56, the secondary of which is connected in the grid circuit of a radio frequency amplifying tube 57. The output of this tube is coupled to an oscillator and mixer tube 58 which functions to mix the signals picked up by the antenna 8 with a radio frequency signal of slightly different frequency produced by the oscillator portion of the tube 58 to thereby produce an output of intermediate frequency equal to the difference in frequency between the oscillator signal and the A—B signals.

This intermediate frequency is amplified by intermediate frequency amplifying tubes 59 and 60 and by a power amplifier 61. The output of the power amplifier 61 is connected to a rectifier 62, in the cathode circuit of which is included a resistance 63 across which appears the rectified voltage represented by the curve 50 of Fig. 3 previously discussed. The intermediate frequency component of this voltage is filtered out by means of condensers 64—65 and a resistance 66 and the direct current voltage is blocked by a blocking condenser 67. The condenser 67 is connected to a conductor 68 which interconnects the grids of amplifying tubes 69 and 70, these grids being also maintained at a direct ground potential by a ground connection through a grid resistance 71. The voltage which is thus applied to the grids of the tubes 69 and 70 is the alternating voltage represented by the curve 51 in Fig. 3.

Before describing the operation of the tubes 69 and 70 and the circuits associated therewith, attention is directed to Fig. 7 where the grid voltage curve 51 is reproduced to a somewhat larger scale and indicated by the heavy line 51'. It can be shown that the wave form of the curve 51' comprises a fundamental sine wave having the same frequency as the curve 51' upon which is superimposed an infinite number of sine wave harmonics in progressively diminishing amplitudes.

Of these various components, the fundamental and the second harmonic appear to the greatest amplitude. The light lines 72 and 73 in Fig. 7 represent such a fundamental and second harmonic, whereas, the dotted line 74 represents the net sum of the fundamental 72 and its second harmonic 73.

It will be noted that the curve 74 embodies the essential characteristic of the curve 51'; namely, a high positive peak of short duration and a low value negative peak of long duration. Thus it follows that the voltage 51 which is applied to the grids of the tubes 69 and 70 may be broken down into a fundamental sine wave having the same frequency as the alternating voltage 51 and a second harmonic having twice that frequency and half the amplitude of the fundamental. Accordingly, the output of the tube 69 is coupled through a coupling circuit 75 to a power amplifier tube 76 to comprise a high frequency channel tuned to pass and amplify the second harmonic 73 and to reject the fundamental 72.

In a similar manner the output of the tube 70 is coupled through a coupling circuit 77 to a power amplifier tube 78 to comprise an amplifying channel adapted to pass and amplify the fundamental 72 and to reject frequencies both higher and lower than this fundamental.

The input circuits for the tubes 69 and 70 are identical in principles as are the coupling devices 75 and 77 and hence it is deemed sufficient to describe in detail but one of each of these circuits.

The cathode of the tube 69 is connected to ground through a cathode resistance 79 which is shunted by a by-pass condenser 80, the resistance 79 being employed in the conventional manner to provide the desired grid bias for the tube. The cathode circuit for the tube 69 also includes a relatively high inductance 80″ to suppress static and other undesirable high frequency signals which may appear in the input circuit of the tube 69. The output of the tube 69 is coupled to the coupling circuit 75 as by means of a plate blocking condenser 81.

The coupling circuit 75 embodies a transformer which includes a primary 82 and a secondary winding 83, the lower ends of which are interconnected as by a conductor 84 and connected to ground through a condenser 85. The upper end of the primary 82 is connected to the output of the tube 69 through the condenser 81, whereas, the upper end of the winding 83 is connected to the grid of the tube 76 through a grid bias cell 86 adapted to provide the desired value of negative grid bias on the tube 76.

A fixed tuning condenser 87 is connected between the upper terminal of the winding 83 and ground, whereas, a similar condenser 88 is connected between the upper terminal of the winding 82 and ground. The winding 82 is tapped as at 89 and connected to ground through a resistance 90, the tap 89 being located at a point of zero voltage with respect to the alternating voltage appearing across the winding 82.

The constants of the above described circuits are so chosen that the inductance of the winding 82 shunted by the series connected condensers 88 and 85 is tuned to the frequency of the second harmonic 73 of Fig. 7. Similarly, the series connected condensers 85 and 87 are so chosen with respect to the inductance of the winding 83 as to tune that circuit to the frequency of the second harmonic. The capacity of the condenser 85 is so chosen with respect to the mutual inductance of the windings 82 and 83 as to provide an extremely low impedance path to ground for signals having a frequency one-half that of the harmonic 73. The coupling circuit 75 thus serves to pass to the tube 76 the signal comprising the second harmonic 73 while serving at the same time to definitely filter out and exclude from the tube 76 the fundamental represented by the curve 72 in Fig. 7.

The resistance 90 serves to connect the winding 83 to ground as regards direct current so as to permit the cell 86 to apply the requisite grid bias to the tube 76. By connecting the resistance 90 to the zero voltage point 89 on the winding 82, the resistance 90 does not in any way affect the tuning of the coupling circuit.

The same considerations are involved in the choice of the constants for the coupling circuit 77 with the exception that this circuit is tuned to pass the fundamental 72 of Fig. 7 and to definitely reject signals having half that frequency. The second harmonic is substantially excluded from the tube 78 by the tuning effect of the coupling circuit 77 and this selectivity may be further increased by proper choice of inductance for the cathode circuit inductance 80′ for the tube 70.

The output of the power amplifier 76 is connected to a primary winding 91 of an output transformer 92, which transformer is provided with two electrically separated secondary windings 93 and 94. The outermost terminals of the windings 93 and 94 are connected, respectively, to the plates of the grid controlled rectifier tubes 95 and 96, the grids of these tubes being connected in parallel as by a conductor 97 and coupled to the output of the amplifier tube 78 as by means of a condenser 98 and resistance 99.

The cathodes of the rectifiers 95 and 96 are interconnected and connected to ground through the cathode bias resistor 100 which is preferably shunted by a by-pass condenser 101. The winding 93 is preferably tuned to the frequency of the second harmonic 73 as by a condenser 102 and the inner end of this winding is connected as by means of a conductor 103 through a resistance 104 to ground, this resistance being shunted by a condenser 105. In a similar manner the winding 94 is tuned by a condenser 106 and the inner end of the winding is connected by a conductor 107 to ground through a resistance 108 which is shunted by a by-pass condenser 109.

The conductors 103 and 107 are, respectively, connected through resistances 110 and 111 to vacuum tubes 112 and 113, the plates of these tubes being interconnected by a galvanometer 114 and to a suitable source of plate potential by plate resistances 115 and 116, respectively. The requisite grid bias for the tubes 112 and 113 is obtained by interconnecting the cathodes of these tubes and connecting the interconnected cathodes to a tap 117 of a potentiometer comprising resistances 118 and 119 connected between the source of plate potential and ground.

The manner in which the above described apparatus operates may best be understood by assuming certain operating conditions and describing the operation of the device with particular reference to Figs. 3, 7 and 8.

As was pointed out in connection with the first described form of my invention, the signal which is picked up by the antenna 8, amplified by the amplifier 57, converted to an intermediate frequency by the mixer tube 59 and amplified by the amplifier tubes 59, 60 and 61 is represented by the curve 49 of Fig. 3 if it be assumed that the plane or vehicle P is to the left of the desired course and in the "off course" area 3. Upon rectification of the signal 49 by the rectifier 62, there is developed across the resistance 63 a pulsating direct potential such as that represented by the curve 50 in Fig. 3. The filter network 64—65—66 and the condenser 67 serve to eliminate the intermediate frequency component and to shift the axis of zero voltage so as to apply to the grids of the tubes 69 and 70 a voltage such as that represented by the curve 51 in Fig. 3. This voltage being of a complex wave form is analyzed by the tubes 69, 70 and their associated coupling circuits 75 and 77 into the fundamental 72 and the harmonic 73 so that there is applied between the plate and cathode of the tube 95 an amplified second harmonic 73. This plate to cathode voltage of the tube 95 is represented in Fig. 8 by the sine curve 120 shown in solid lines in that figure.

Since the transformer secondary winding 94 is opposed to the winding 93, there will be applied between the plate and the cathode of the tube 96 a voltage similar to the voltage 120 but being 180° out of phase with respect thereto. This voltage which appears between the plate and cathode of the tube 96 is represented by the curve 121 shown in solid lines in Fig. 8.

The fundamental 72 of Fig. 7 is amplified by the tubes 70 and 78 and is applied through the coupling 98—99 to the grids of both of the tubes 95 and 96. This grid voltage is represented by the curve 122 of Fig. 8. The bias resistance 100 for the tubes 95 and 96 is so chosen as to shift the axis of the curve 122 an amount represented by the dimension line 123 in Fig. 8 sufficient to make the lateral width of that portion of the curve 122 which is positive with respect to ground equal to the lateral width of the curves 120 and 121 at the axis of these curves.

It will be noted that under the assumed conditions; namely, that the vehicle P is in the "off course" area 3 so that the signal A predominates in intensity over the signal B, the phase relation between the fundamental 72 and the harmonic 73 will be as shown in Fig. 7. This phase relationship is reproduced in the curves 120, 121 and 122 of Fig. 8. By comparing these curves it will be noted that every other positive half cycle of the curve 120 occurs during the same time as does positive portions of the curve 122. To facilitate this comparison the positive portions of the grid voltage curve 122 have been shaded and those positive loops of the curve 120 which occur at the same instant as do the periods of positive grid voltage have been similarly shaded. Thus, the plate of the tube 95 is positive with respect to its cathode at the same time that the grid of this tube is also positive with respect to the cathode. Thus the tube 95 is capable of rectifying and a corresponding direct current, therefore, flows through the resistance 104 which results in the conductor 103 having a negative potential with respect to ground.

The condenser 105 which is connected in shunt relation to the resistance 104 is preferably provided with a capacity sufficiently large with respect to the resistance 104 as to maintain the voltage across the resistance 104 during the time between the periodic moments of rectification of the tube 95. The direct potential which is thus applied to conductor 103 is such as that represented by the curve 124 in Fig. 8.

By comparing curves 121 and 122, it will be noted that at no time does the grid and plate of the tube 96 have positive potentials applied thereto at identical times with the result that the tube 96 will not perform any rectifying function and no voltage will be developed across the resistance 108. Thus the conductor 107 remains at ground potential.

The tubes 112 and 113 are normally biased to operate on the straight portion of the grid voltage-plate current curve, this grid bias voltage being represented in Fig. 8 by the dimension line 125, and the resistances 115 and 116 are so chosen that the voltage of both of the plates with respect to ground will be equal when the grids of the tubes are both maintained at ground potential. It will be noted that the plate to cathode resistance of the tubes 112 and 113 and the plate resistances 115 and 116 define a Wheatstone bridge circuit in which the galvanometer 114 is connected as the balance responsive element. Thus the galvanometer 114 will always indicate center zero when the grids of both of the tubes 112 and 113 are maintained at ground potential.

Under the assumed conditions, however, the grid of the tube 113 is maintained at ground potential by virtue of its connection to the conductor 107 while the grid of the tube 112 will be depressed to a voltage which is negative with respect to ground by virtue of its connection to the conductor 103. The application of the negative voltage to the grid of tube 112 will throw the Wheatstone bridge out of balance and this out of balance condition will be indicated by a corresponding deflection of the galvanometer 114. This deflection of the galvanometer will, therefore, serve to indicate that the plane or vehicle P is to one side of the "on course" zone and in the "off course" area 3.

By having reference to Fig. 7 it will be observed that should the B signal predominate over the A signal so that the voltage which is applied to the grids of the tubes 69 and 70 is characterized by a low positive peak and a high negative peak, the analysis of this voltage into the fundamental 72 and the harmonic 73 results in the phase of the harmonic 73 being precisely reversed; that is, with the negative peaks at the points now occupied in Fig. 7 by the positive peaks. This change will also reverse the phase of the voltage which is applied between the plate and cathode of the tubes 95 and 96, this phase reversal being indicated in Fig. 8 by the dotted lines 120' and 121'.

Comparing the grid voltage curve 122 with the dotted plate voltage curves 120' and 121' will show that the tube 95 will never be in a condition to rectify the signal applied thereto, whereas, the grid and plate of the tube 96 will periodically become positive at the same instant as is represented by the shaded portions of the dotted curve 121' so that this tube may rectify. The result is that the grid of the indicator tube 112 is maintained at ground potential, whereas, the grid of the tube 113 is depressed to a negative value with respect to ground by virtue of its connection to the conductor 107 embodied in the cathode circuit to the tube 96. This likewise produces an unbalanced condition of the Wheatstone bridge circuit but the circuit is unbalanced in the opposite direction from that previously described so that in the instant case the galvanometer deflection is in the opposite direction and serves to indicate that the plane or vehicle P has wandered in the opposite direction from the "on course" line and into the "off course" zone 4.

The galvanometer 114, of course, indicates center zero when the plane or vehicle P is "on course" for the reason that a pure direct potential is developed across the resistance 63, which potential is blocked by the condenser 67 so that no alternating voltage is applied to the grids of the tubes 69 and 70. Thus, no control voltage is developed by the rectifiers 95 and 96 and the tubes 112 and 113 are maintained in their normal operating condition corresponding to a balanced condition of the Wheatstone bridge.

From the foregoing it will be observed that I have provided a novel receiving and indicating apparatus for use with radio beacon systems of the equi-signal type, which apparatus is particularly adapted to provide a sensitive and dependable visual indication of the location of the aircraft or other vehicle with respect to the course which is defined by the radio beacon system.

It will be noted that the first described modification of my invention operates to identify which side of the course the vehicle may be located by determining the polarity of the maximum voltage resulting from a rectification of the beacon signals. Conversely, the second described modification of my invention functions to analyze the voltage resulting from the rectification of the beacon signals into a fundamental and second harmonic and indicates which side of the course the plane or vehicle is situated by indicating the phase relation between this fundamental and its harmonic.

Attention is directed to the fact that the device of my invention is adapted for use with substantially any equi-signal radio beacon system, the only requirement being that the keying of the transmitters employed in such system be such that the time of transmission of one of the signals exceeds the time of transmission of the other. By a relatively small and inexpensive change, the presently commercial radio beacon systems of the A—N type could be readily adapted for use with the radio beacon receiver and indicator of my invention, this small change comprising merely an adjustment of the keying sequence to provide for the difference in time of operation above mentioned.

While I have shown and described the preferred embodiment of my invention, I do not desire to be limited to any of the details of construction shown or described herein, except as defined in the appended claims.

I claim:

1. The method of visually indicating the predominance in intensity of one of two radio signals of like frequency which are produced alternately in a recurring time cycle and for unequal periods in each cycle which consists in receiving and rectifying said signals to produce a direct potential which pulsates in accordance with the alternate production of said signals, separating the direct potential component from the alternating potential component of said pulsating potential, ascertaining the polarity of the maximum potential peak of said alternating potential component by separating from said alternating potential component the fundamental and second harmonic sine wave components, and determining the multiple phase relation between said sine wave components.

2. In a device for visually indicating the predominance in intensity of one of two radio signals of like frequency which are produced alternately in a recurring time cycle and for unequal periods in each cycle, the combination of: a radio frequency amplifier for receiving and amplifying said signals; rectifying means for rectifying said amplified signals to produce a direct potential which pulsates in accordance with the alternate production of said signals; filter means for separating the alternating potential and direct potential components of said pulsating potential; separate low frequency amplifying channels, one tuned to pass and amplify only the sine wave fundamental of said alternating potential component and the other tuned to pass and amplify only the sine wave second harmonic of said alternating potential component; and means connected to receive the output of both of said low frequency amplifying channels and determine the multiple phase relation between said fundamental and said second harmonic.

3. In a device for visually indicating the predominance in intensity of one of two radio signals of like frequency which are produced alternately in a recurring time cycle and for unequal periods in each cycle, the combination of: a radio frequency amplifier for receiving and amplifying said signals; rectifying means for rectifying said amplified signals to produce a direct potential which pulsates in accordance with the alternate production of said signals; filter means for separating the alternating potential and direct potential components of said pulsating potential; separate low frequency amplifying channels, one tuned to pass and amplify only the sine wave fundamental of said alternating potential component and the other tuned to pass and amplify only the sine wave second harmonic of said alternating potential component; a pair of grid controlled rectifiers connected in a full wave rectifying circuit with said other amplifying channel and having separate load resistances; means connecting the output of said one amplifying channel to the grids of said grid controlled rectifiers; and means for measuring the direct potential across said load resistances.

4. A device for visually indicating the polarity of the maximum potential peak of an alternating potential of asymmetric wave form comprising separate low frequency amplifying channels, one tuned to pass and amplify only the sine wave fundamental of said alternating potential and the other tuned to pass and amplify only the sine wave second harmonic of said alternating potential; and means connected to receive the output of both of said low frequency amplifying channels and determine the multiple phase relation between said fundamental and said second harmonic.

WILLIAM J. O'BRIEN.